United States Patent [19]

McCaskill et al.

[11] Patent Number: 5,017,395
[45] Date of Patent: May 21, 1991

[54] METHOD OF MAKING A STEAMTABLE QUALITY PARBOILED RICE PRODUCT

[75] Inventors: Don R. McCaskill; Frank T. Orthoefer; Steven D. Danforth, all of Stuttgart, Ark.

[73] Assignee: Riceland Foods, Inc., Stuttgart, Ark.

[21] Appl. No.: 507,445

[22] Filed: Apr. 11, 1990

[51] Int. Cl.⁵ .................... A23B 4/03; A23L 1/182
[52] U.S. Cl. .................... 426/459; 426/455; 426/456; 426/627
[58] Field of Search ............... 426/455, 456, 459, 627

[56] References Cited

U.S. PATENT DOCUMENTS

| | | | |
|---|---|---|---|
| 3,959,515 | 5/1976 | McCabe | 426/627 |
| 4,333,960 | 6/1982 | Barry et al. | 426/625 |
| 4,361,593 | 11/1982 | Brooks et al. | 426/627 |
| 4,521,436 | 6/1985 | Lou et al. | 426/104 |
| 4,649,055 | 3/1987 | Kohlwey | 426/449 |
| 4,794,012 | 12/1988 | Taniguchi et al. | 426/462 |
| 4,810,511 | 3/1989 | Vellupillai et al. | 426/242 |

Primary Examiner—Marianne Cintins
Assistant Examiner—Helen Pratt
Attorney, Agent, or Firm—Stephen D. Carver

[57] ABSTRACT

A process of producing a high-stability parboiled rice product which is not quickly rehydrated, but which is highly resistant to breakdown during long periods of steamtable exposure. The parboiling process comprises a hot water soak followed by steaming to effectuate substantially complete gelatinization. The rice is then pre-dried at an elevated temperature and tempered for an extended period of four to six hours. Plural stages following tempering reduces stress and thus enhances kernel integrity.

4 Claims, 5 Drawing Sheets

METHOD OF MAKING A STEAMTABLE QUALITY PARBOILED RICE PRODUCT

BACKGROUND OF THE INVENTION

This invention relates broadly to parboiled rice products and to methods for producing parboiled rice. More particularly, the present invention relates to a parboiled rice product exhibiting greatly improved steamtable quality, characterized by an enhanced resistance to breakdown. Methods of the invention relate to rice parboiling processes sequentially involving soaking, steaming, drying and tempering stages.

As will be appreciated by those familiar with rice processing methods, the broad concept of parboiling rice to preserve its nutritional integrity and resistance to insect invasion during long storage periods has been known and applied for hundreds of years. The main advantage of the parboiling process is the resulting retention of nutrients and minerals in the starchy center of the rice. Over the years, it has been demonstrated that parboiling also results in a grain which is more easily dehulled, is more resistant to breakage during milling, has a higher percentage of superior quality bran oil, and withstands longer cooking times without becoming undesirably sticky.

Broadly, parboiling comprises the steps of soaking the harvested grains in water to increase the moisture content, steaming the moistened grains under pressure, and subsequently drying the rice prior to storage and milling. The soaking and steaming steps result in swelling and restructuring of the starch granules or starch-lipid complex in the rice grain. Research indicates that the overall minimum moisture content achieved during soaking and steaming is roughly 30% dry solids basis (d.s.b.) Drying typically comprises a plurality of drying phases during which the rice temperature and moisture content are gradually reduced so that heat stresses on the rice are minimized. During drying, the rice endosperm hardens, making the grain more resistant to breakage during milling. Milling removes the outer hull and bran layers from the starchy center of the rice grain.

Prior parboiling practices can be divided into three broad categories: the "conventional" method, the dry-heat method, and the pressure-steaming method. The conventional method comprises soaking, draining, steaming at atmospheric pressure, followed by drying and milling stages. The dry-heat method replaces the steaming step of the conventional method with a heating stage, in which the rice is cooked in dry, hot air or sand prior to drying. Finally, the pressure-steaming method comprises a low moisture initial soak (roughly 25-67% d.s.b. moisture content) followed by pressurized steaming prior to drying and milling. Various combinations of these individual steps have been applied in the art.

Parboiled rice finds a ready market in both large food service organizations, and in the home. Simple parboiled rice usually requires relatively long cooking times, which is a disadvantage for home use where "quick cooking rice" is favored. To produce quick cooking rice, an "instantization" process is required after parboiling, raising the cost of the product. Larger institutions, however, do not require quick cooking rice, since they have more than adequate time to slow-cook traditionally parboiled rice.

As will be appreciated by those skilled in the food service arts, in larger food service organizations such as institutions, cafeterias and the like, foods such as rice are commonly pre-cooked in volume and then transferred to steamtable pans. Typically, the pans are held in hot steam carrier cabinets or "carters" at temperatures of between 70-105 degrees Celsius prior to serving. When serving commences, the heated pan will be transferred to a steamtable and maintained at serving temperatures typically between 50-70 degrees Celsius.

Many relatively large scale food service operations have found it convenient and profitable to reduce labor-intensive individual service by abandoning a-la-carte offerings in favor of self-serve "buffets" or cafeterias. In such establishments a variety of conventional steamtables are quite commonly used for temporarily storing food, while maintaining the desired temperature. Even in "full service" restaurants or diners steamtables are often employed adjacent a salad bar, and their use provides customers with a convenient "self service" option. While such arrangements no doubt offer many advantages, product losses as a result of food deterioration over time can often result.

A clear advantage of steamtables is that while the food remains hot for serving, the food tends not to dry out in the heat. But conventionally processed parboiled rice may degrade measurably in response to steamtable overexposure. As will be appreciated, however, steam introduces water to the food product, and foods continue to slowly cook during steamtable storage. Since hot foods served in a typical luncheon buffet may remain over burners or in steamtable trays for a full two to three hour serving period, steamtable foods eventually tend to become soft and mushy, overcooked, and tasteless. Conventional rice processed by typical prior art parboiling methods is particularly vulnerable to steamtable degradation.

The focus of many prior art rice processing developments discussed below has been to produce a quick-cooking rice product for home consumption. Processes for "instantizing" rice require that the rice be essentially fully cooked after milling and redried (whether made from raw white or parboiled rice), resulting in substantial grain breakage and increased energy costs. As a result instantized rice is more expensive than mere parboiled rice. "Instant" or "quick-cooking" rice products are capable of rapid rehydration, so that cooking times are meaningfully shortened. While not a major consideration for large food service operations, a short cooking time is extremely important, for example, to one preparing a typical family meal for a small or limited number of diners. Food products which are capable of "instant" cooking are in great favor for home-prepared family meals. The shorter the cooking time of the various menu items, the easier it can be for the head of the household to coordinate the meal and serve all items concurrently. Rice provides a tasty and convenient side dish and thus quick-cooking rice products are in great demand.

But instantized rice which may be ideal for home preparation is not optimum for larger food services employing steam tables. Such rice is more expensive than simple parboiled rice, and its primary consumer advantage, that of "quick cooking," is not a benefit to food service establishments which typically have several hours to prepare their food. Further, we believe that many instantized rice products are at least somewhat susceptible to steam table degradation. Moreover, the known prior art has not attempted to customize a parboiled rice product which is immunized from the above discussed phenomena of steam table degradation. After relatively short periods of steamtable exposure, even quick-cooking rice may partially degenerate, as multiple kernels fall apart and clump together in an unappealing, soft, "pasty" mass. Over time the steamtable storage of rice typically results in the loss of consumer-appealing color, texture, and flavor.

As a result of steamtable degradation, rice is wasted. For large volume cafeterias, for example, cumulative food service losses engendered by wasted, steamtable-degraded products can be prohibitive. Hence, it is desired to produce a rice product which maintains an appealing light color and a chewy, non-sticky texture after extended periods of steamtable storage.

Recent research efforts to improve parboiled rice products have been directed at the modification of the rice starch structure. Modifying the grain starch in various ways may result in desirable product qualities, such as quick-cooking, freeze-thaw stability, and resistance to breakdown or "mushiness" during cooking. Native starch exists in two related forms in the rice granule, as amylose, or the "straight-chain" form and as amylopectin, or the molecular "branch" form. The greater percent of native rice starch is amylopectin. In the past, chemical treatments have been used to modify the native starch structure to achieve different qualities.

It has also been found advantageous to force gelatinization of rice starch granules. For purposes of this discussion, "gelatinization" refers to the disruption of the crystalline structure of the rice starch, usually as a result of the addition of water by soaking and steaming. In effect, gelatinized starch granules are "melted" together into an amorphous mass. Ungelatinized, crystalline starch is generally white in color. Most prior art parboiling methods attempt to avoid any significant gelatinization in the soaking phase and to vary steaming time, pressure, and temperature in order to thereafter effectuate the desired degree of gelatinization. As demonstrated in the specific examples discussed hereinafter, different processing methods achieve varying degrees of gelatinization of the native rice starch. As revealed in the prior art discussed hereinafter, at least some degree of gelatinization of the rice starch is desired in order to provide rice with improved kernel integrity when cooked.

Modified or gelatinized starch may also "reassociate" or recrystallize in different forms. In essence, the starch is crystallized from its gelatinized state to a strongly angular starch crystal structure. The extent of starch reassociation depends on both the moisture content and the temperature of the stored rice. As will be demonstrated in the specific examples hereinafter, reassociation forms new starch linkages which substantially affect product stability.

In this context, the term "stability" refers generally to the resistance of rice to the release or "leachout" of free starch during and after cooking. "Kernel integrity" broadly refers to maintenance of firm and compact individual grains throughout cooking. Typically, kernels of rice cooked or steamed for long periods of time will split open and fall apart. As the starch is freed or released from the kernel, the rice becomes sticky or pasty and may mass into unmanageable clumps.

Rice stability and kernel integrity can be measured through the use of various subjective standardized taste and visual tests after cooking. "Cooked quality" of the rice is measured immediately after cooking, and includes analysis of the rice texture, color, amount of free starch or stickiness of the cooked rice, and kernel integrity. The scores are commonly averaged together to obtain an overall average cooked quality score. Similar standard tests are conducted to determine "steamtable quality". Steamtable quality as used herein is measured after the rice has been exposed to water and heat on the steamtable for a predefined period. The scores for texture, color, free starch, kernel integrity, and overall steamtable quality can be readily compared to cooked quality scores. Various qualities of a rice product can also be predicted prior to cooking through the use of other laboratory procedures.

The degree of starch gelatinization and the amount of starch reassociation in a rice granule may be revealed with the use of a differential scanning calorimeter (DSC). DSC scans are used widely in the plastics industry to measure endothermic and exothermic characteristics of materials at given temperatures. Amylopectin starch is a naturally occurring high polymer, and thus naturally lends itself to DSC testing. A rice sample subjected to a DSC scan displays a heat flow curve, which can be compared to standard curves for interpretation of the internal structure and characteristics of the rice starch.

All of the above standard tests commonly applied in the food industry facilitate comparison of rice samples produced under different processes. The food service industry, however, is now most interested in consistent performance of the rice product on the steamtable. Additionally, the food canning and freezing industries may benefit.

A number of prior art methods are directed to the production of "quick cooking" or rehydratable rice which overcome problems resulting from undesirably long cooking times, particularly associated with "brown" rice products. One such "instantizing" method is disclosed by McCabe in U.S. Pat. 3,959,515, issued May 25, 1976 and comprises alternating soaking and baking stages. Soaking the rice results in starch gelatinization and increased grain size. Baking at temperatures of approximately 300 degrees F. dries the grains for storage and provides desirable color quality.

Other methods for producing "precooked" or quick-cooking rice products are described by Lou in U.S. Pat. No. 4,521,436, issued June 4, 1985; Barry, U.S. Pat. No. 4,333,960, issued June 8, 1982; and Kohlwey, U.S. Pat. No. 4,649,055, issued Mar. 10, 1987. The last two references disclose an additional puffing stage in which the rice is expanded under high heat.

The parboiling process set forth in U.S. Pat. No. 4,810,511 issued to Velupillai on Mar. 7, 1989 is directed mainly to reduction of energy expenditures and resultant product costs. The initial soaking stage results in a 26-32 percent (wet basis) water content. Thereafter the rice slurry is exposed to microwave energy (heated) for partial gelatinization to roughly forty percent water content. The rice is then drained and microwaved a second time to a water content of roughly fourteen percent The process results in a rice product which is substantially completely gelatinized, and purportedly resulted in higher than average milling yields.

Taniguchi, in U.S. Pat. No. 4,794,012 issued Dec. 27, 1988, proposes a method for producing a pregelatinized rice which can be stored for long periods and quickly cooked, for example, in a microwave oven. The method comprises successive soaking steps during which temperatures are gradually raised to prevent undesired putrefaction and to increase uniform moisture distribution throughout the rice grain. The rice is then steamed and boiled, resulting in gelatinization, with a moisture content of 45-75 percent w.b. Finally, the grains are dried and puffed to reduce the moisture content to roughly eight percent.

The aforementioned prior art references are generally directed to producing quick-cooking or instantized rice products. Increased starch gelatinization is achieved during initial steaming stages. Based on our experimentation, none of the above-referenced methods is capable of economically producing a rice product which is suitably resistant to steamtable breakdown. Moreover, none of the above-addressed prior art suggests effective means for both increasing rice kernel integrity and controlling energy expenditure and resultant production costs.

One reference of relevance to the present process and product is U.S. Pat. No. 4,361,593, issued Nov. 30, 1982 to Brooks. It is noted that the process defined therein is directed to the production of a parboiled rice suitable for subsequent instantization. Briefly, the '593 process comprises an initial soaking step, i which the moisture content is raised to 30-45 percent w.b.; a high-pressure steaming step, in which the degree of gelatinization is closely restricted; and an extended, controlled "tempering" step, which purportedly reduces the amount of free starch in the rehydrated rice. In this context, "tempering" generally refers to a "resting" period in which starch molecules are permitted to associate into water-resistant bonds at lower temperatures, averaging roughly 100 degrees Celsius. The tempering step purportedly hardens the starch in the rice and assures a non--sticky, quick--cooking rice product. After the tempering step, the rice is slowly dried to a moisture content of under fifteen percent w.b.

In U.S. Pat. No. 4,361,593 drying does not precede tempering. In column 5, lines 56-60, the latter reference states that "...Where the moisture content is reduced too rapidly to too great an extent...the tempering will not proceed to the proper degree and the product will tend to be relatively more starchy." The prior art thus teaches away from our concept, since we have found that a predrying step prior to tempering can be critical to the production of a parboiled rice product of enhanced steamtable quality.

Based on experimentation, however, it has been demonstrated that thus restricting gelatinization substantially reduces kernel integrity. In addition, tempering moist rice at high temperatures actually retards starch reassociation. While the process purportedly favors the production of a quick-cooking rice, it is demonstrated incapable of producing a high-stability, steamtable rice product, such as is currently in commercial demand.

Importantly, it is our experience that tempering the rice directly after steaming is commercially impractical. For example, the rice of the '593 method is immediately tempered after steaming. However, when very moist rice is stored for tempering as taught, the rice tends to release starch and "ball up" into sticky masses which cannot be conveyed or handled conveniently as individual or separate grains. Additionally, while such a high moisture tempering process may be easily carried out in the research laboratory, its translation to the production environment is highly impractical. Special equipment and processing required to accomplish such tempering would greatly raise production costs and render the rice end product too expensive for commercial purposes. In addition, the '593 process tends to reduce milling yields, which in turn further increases production costs.

Thus it is desired to provide a rice parboiling process which provides substantially complete gelatinization and favors starch reassociation whereby to yield a high-integrity kernel. No teaching is found in the prior art known to us for an economically feasible process for simultaneously achieving substantially complete gelatinization and controlled tempering for attaining high starch reassociation. None of the known prior art discloses adequate means for efficiently producing a rice product which retains kernel integrity as well as desirable color, texture, and taste qualities during extended periods of steamtable storage.

SUMMARY

The present invention is directed to a rice product which exhibits enhanced steamtable breakdown resistance, as well as a parboiling process for producing such rice. The high-stability rice product is resistant to breakdown under heat and moisture stresses typically experienced during long periods on a buffet steamtable.

The resulting rice product is not quickly rehydrated and thus takes longer to cook. Importantly, the latter characteristic is not crucial to most food service operations employing steam tables. Our new rice product displays high kernel integrity, low water uptake, and maintains appealing flavor, texture, and color during long periods of steamtable exposure. The process affords a rice product having the desired qualities without the use of chemical treatments and at minimum equipment cost.

The parboiling process of the present invention begins with hot water soaking to raise the rice moisture content. A subsequent pressure steaming step raises the moisture content to approximately 49-54 percent d.s.b. In the steaming step substantially complete gelatinization of the rice starch is achieved. It is generally accepted that as the moisture content of starch decreases, the gelatinization time and temperature increase.

Thereafter, in a critical predrying stage the rice moisture content is reduced to 25-33 percent d.s.b. Predrying is followed by an extended tempering step averaging four to six hours in duration. Preferably, tempering temperatures ranging from 38 to 66 degrees Celsius and a moisture content of 25-33 percent d.s.b. are maintained. Substantial starch recrystallization is achieved. Additionally, it is shown that reassociation at high temperatures is favored by low moisture content. Successive drying steps maintain kernel integrity, and establish a favorable storage moisture content of approximately sixteen percent d.s.b. Thereafter, the rice may be stored or milled. When milled the outer bran layers are substantially completely removed.

Importantly, subsequent milling processes are virtually unaffected by our new process. No reduction in milling yields has been noted in rice produced in accordance with the process. Further, experimentation reveals that the present process results in higher quality of texture, free starch content, and kernel integrity. As a result, food losses based upon the number of unserved portions (i.e. unconsumed food portions abandoned on the steamtable) are substantially reduced.

The tempering bin system used for effectuating the process of the present invention comprises a small batch continuous system. A plurality of thermally insulated bins containing multiple, operatively associated hoppers are sequentially employed to achieve first in, first out (i.e. FIFO) bulk processing. Each of the bins comprises a channeled inlet for receiving rice passing from the initial drying stage, and each is fed by a cyclone distributor unit. Each of the bins is preferably thermally insulated. Individual bin hoppers are serially filled, and when the bin is to be emptied, the individual hoppers are emptied in the same order to effectuate FIFO processing. Each individual hopper comprises baffle structure for holding the rice for tempering. The baffles facilitate the downward travel of rice through an air-controlled outlet gate which dispenses the tempered rice onto a conveyor system for further processing. A first-in-first-out tempering stage is thus achieved.

Hence it is a fundamental object of the present invention to provide a steamtable-resistant, parboiled rice product.

A related object is to provide a process for producing a high-stability parboiled rice product which, although not rapidly rehydrated, is substantially immunized from steamtable degradation.

Another basic object of the present invention is to provide a practical and cost-effective method for producing a highly stable rice product suitable for economic consumption in large volume food service institutions.

A further broad object of our invention is to provide a rice product which demonstrates high steamtable stability while retaining appealing color, flavor, and texture.

Another object of the present invention is to provide a process for producing a rice product which is resistant to moisture stress and starch leachout for long periods after cooking.

Still another object of our invention is to provide a rice product which requires longer initial cooking times, but is capable of maintaining appealing quality during extended storage on a steamtable.

Another object is to provide a non-chemical process for producing a highly stable, steamtable rice product.

A further object of the present invention is to provide a process for producing a steamtable rice product which incorporates a low-moisture tempering step between drying stages.

A still further object of the present invention is to provide a rice product which, by virtue of its greater steamtable stability, will result in substantial decrease of food waste.

Another object of the present invention is to provide a process for producing a high-stability rice product having lower free starch levels after cooking.

Yet another object is to provide a parboiled rice product suitable for the prepared foods processing industry.

Still another object of the present invention is to provide a process for producing a completely gelatinized (85% or more) steamtable rice product having a lower maximum water uptake at room temperatures than has been previously achieved through pressurized steam processes.

Yet another specific object of the present invention is to provide a process of producing a high-stability, low viscosity rice product without deleteriously affecting milling yields.

A further specific object of the present invention is to provide a rice product which is substantially completely gelatinized.

Still another specific object of the present invention is to provide a rice product which displays substantial starch reassociation.

An additional object of the present invention is to provide a rice product which retains appealing color, texture, flavor, and kernel integrity throughout extended serving time periods typical of conventional steamtable operations.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
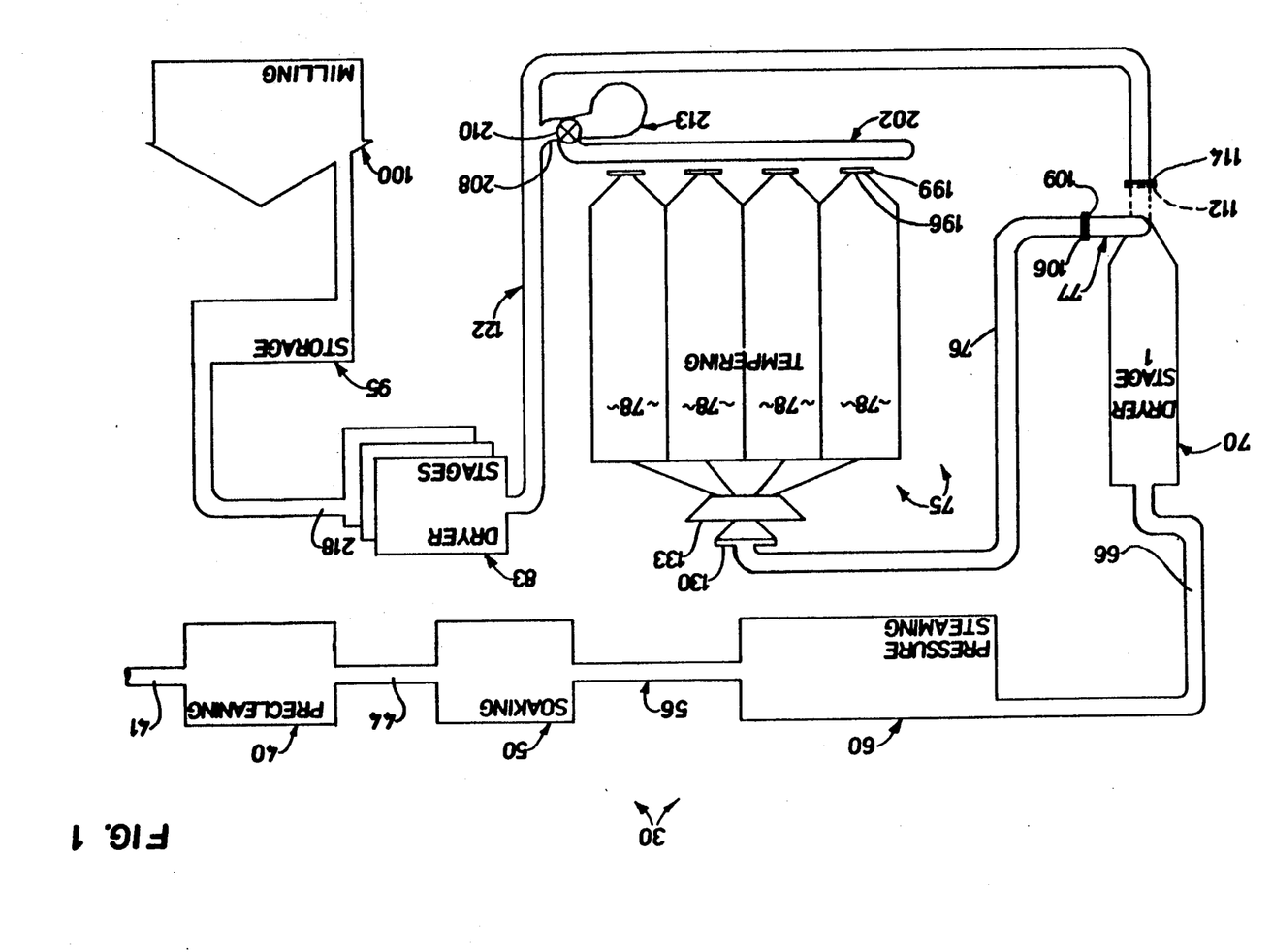
FIG. 1 is a block diagram illustrating the various stages of our improved parboiling method.

The best mode of carrying out the rice parboiling process of the present invention is broadly illustrated in block diagram form in FIG. 1 of the accompanying drawings. The parboiling process, generally designated by the reference numeral 30, broadly comprises a plurality of rice processing steps which result in the production of a high-stability rice product capable of retaining appealing color, flavor, texture, and kernel integrity during long periods of steamtable exposure. The preferred bin apparatus is also disclosed for facilitating an extended tempering stage.

With initial reference now directed to FIG. 1 of the appended drawings, our parboiling process 30 begins with an initial pre-cleaning stage 40, in which rough, harvested rice is cleaned and subsequently sorted according to grain size and quality. Stage 40 is conventional, and it involves processing details which are well known to those skilled in the rice processing arts. For example, pre-cleaning stage 40 involves several different apparatuses, such as conventional grading, sorting and cleaning equipment. Such devices are operatively linked for efficient processing by conventional mechanical conveyors and conduits. Precleaned and sorted long grain rice entering the process at 41 generally has a moisture content of 16 percent dry solids basis (d.s.b.).

After the initial cleaning phase 40 is complete, precleaned rice is transported via conveyor 44 to a system of holding tanks for soaking. As explained in detail hereinafter, the soaking stage 50 effectuates a hot water soak. The soak water is maintained at relatively high temperatures, roughly between 55 and 75 degrees Celsius. The soaking phase 50 preferably results in elevation of the rice moisture content to roughly 43-54 percent d.s.b. Gelatinization of the rice starch during soaking stage 50 is incomplete, since soaking here is merely for hydration. Soaking preferably occurs beneath the final gelatinization temperature of approximately 77 degrees Celsius.

Moisturized rice is conveyed via a valved line 56 which drains the soak solution and dispenses the rice into a pressurized bin for steaming stage 60. Steaming continues at controlled temperatures until substantially complete gelatinization of the rice starch is accomplished. Gelatinization can be monitored by well known techniques including D.S.C. phenomena or loss of birefringence. This latter phenomena generates the optically perceived "maltese cross effect."

Saturated steam is typically injected at ten to twenty p.s i.g. into the tanks and circulated throughout the rice. The steaming stage 60 typically lasts one to ten minutes, until gelatinization is substantially completed. On the average, at least 85 percent gelatinization is achieved. Hence it is important that the desired high moisture content of the rice be established prior to the steaming stage to assure complete gelatinization.

The reference numeral 66 generally designates pneumatic conveying. Predrying stage 70 reduces the rice moisture content and encourages the reassociation of starch in the rice granules into a highly resistant crystalline amylose structure. The initial drying stage 70 (i.e. the "predrying" stage) also facilitates subsequent conveying and storage of the rice granules for further processing. The reassociated starch is substantially prevented from "leaching out" during conveying, so that the individual rice kernels do not lump together into a sticky, unmanageable mass. Predrying stage 70 is followed by tempering. It is important that the temperature of the rice be maintained relatively constant at approximately 55-66 degrees Celsius during conveying, so that rapid cooling does not inhibit desired amylose starch reassociation.

The predried rice is fed into a tempering system broadly designated by the reference numeral 75. Tempering in this context generally means resting or holding at controlled temperature (38-66 degrees Celsius) prior to further processing. As explained in detail hereinafter, tempering encourages starch reassociation in the rice kernel. The tempering system broadly comprises a plurality of bulk storage hoppers 78 internally divided into numerous individual compartments 184 for holding the rice.

Figures 2, 2A:
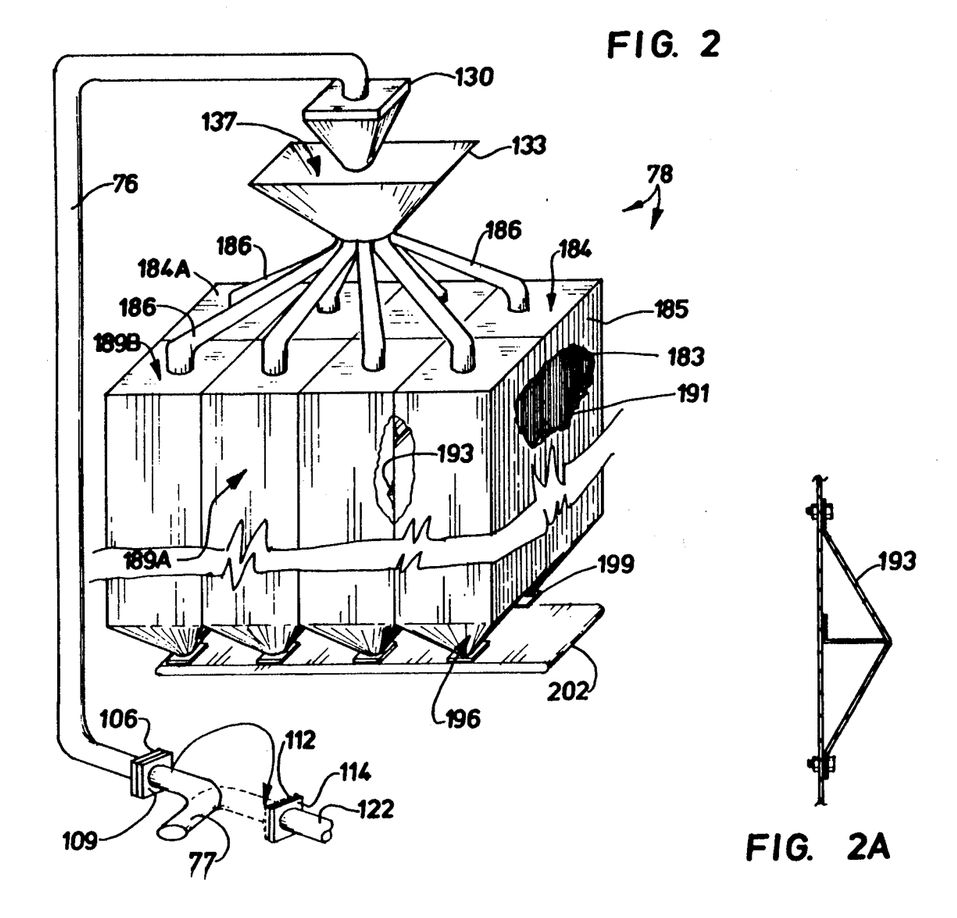
FIG. 2 is a fragmentary, isometric view of the preferred tempering bin system thereof, with alternative path configurations illustrated in dashed lines.
FIG. 2A is an enlarged, fragmentary sectional view of the preferred baffle structure.

When it is desired to produce a highly resistant rice in accordance with the present process, the rice must be routed into the tempering system 75 (FIGS. 1, 2). Rice is distributed into a plurality of tempering hoppers 78, where it remains for an extended, predefined period known as the "dwell time." Preferably, dwell time averages four to six hours. The temperature in the tempering hoppers is maintained at preferably 38-66 degrees Celsius. As best viewed in FIG. 2, each hopper 78 comprises a plurality of separate individual chambers 184.

As illustrated in the examples described hereinafter, tempering favors reassociation of the starch molecules in the rice kernel, and thus enhances kernel integrity. Based on our experimentation, it is critical that the rice be subjected to the initial drying stage prior to tempering, since starch reassociation is favored at elevated temperatures and low moisture content.

The small batch continuous tempering system preserves first in, first out processing. Pipe 77 must be routed as illustrated in FIG. 2 to transmit rice through pipe 76 into one or more hoppers 78. A conventional cyclone separator 130 associated with each hopper feeds the rice into grain distributor 133. Distributor 133 comprises an inlet mouth 137 and a plurality of outlet ports 186 which sequentially feed the individual hopper compartments 184, entering through roofs 184A. The individual hopper compartments are fed serially so that first one is filled, and then filling of an adjacent hopper commences. For example, hopper 189A may be filled prior to hopper 189B. When the rice is released, the hopper compartment which was filled first will be emptied first.

Internal baffles 193 (FIG. 2A) extend angularly outwardly from the interior walls of each chamber 184, and facilitate bulk transfer. Each lower outlet orifice 196 is controlled by an air gate assembly 199. In the best mode each of the tempering hoppers is thermally insulated. Thus a layer of insulation 191 is disposed between outermost walls 185 and inner wall 183.

After tempering, the rice is conveyed to one or more dryer stages 83. When the tempering stage is complete, the rice is released from the tempering hoppers via air gate assemblies 199 onto a conventional conveyor 202, thereafter being fed into conduit 208 via a rotary valve 210 (FIG. 1). A blower 213 associated with conduit 208 drives rice via conduit 208 into dryer input conduit 122. The rice moisture content is reduced to approximately Sixteen percent d.s.b. The gradual reduction of drying temperatures between drying phases reduces the stress on the rice product, thereby increasing rice integrity.

Thereafter, the rice is distributed via conduit 218 into storage stage 95 prior to milling stage 100. In the best mode, the rice is milled until a substantial portion of the outer bran is removed. Depending on market demands, the processed rice may remain in storage for an extended period or be promptly milled.

Alternatively, where it is desired to conventionally parboil, rice may be conveyed directly to the dryer stages 83. The selective channeling of the rice is facilitated by removably connected pipe 77 associated with the end of conduit 76. Conduit 76 terminates in a flange 106 adapted to be coupled to flange 109 associated with pivotal pipe 77. When bolted together, flanges 106, 109 maintain conduit 76 and pipe 77 in alignment. Pipe 77 may terminate at its opposite end in a similar flange 112 which mates with a corresponding flange 114 associated with the dryer input conduit 122. When the system is thus configured, rice exiting the initial drying stage 70 passes from conduit 76, via pipe 77 through dryer input conduit 122 and into the intermediate drying unit 83 without tempering. When the tempering stage is bypassed as described, the connection between conduit 208 and dryer input conduit 122 must also be temporarily blocked by rotary valve 210.

Figure 3A:
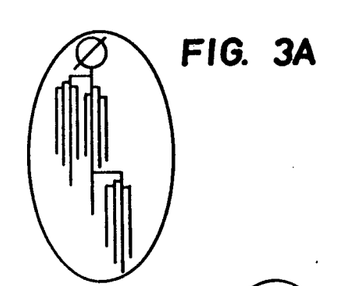
FIG. 3A illustrates the cluster model of native amylopectin starch in the rice kernel as viewed at the molecular level prior to processing.
Figure 3B:
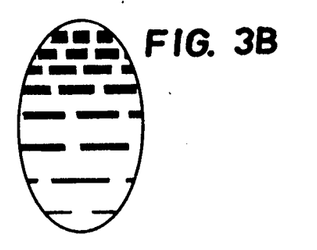
FIG. 3B figuratively illustrates amorphous, substantially completely gelatinized rice starch as viewed at the molecular level after steaming.
Figure 3C:
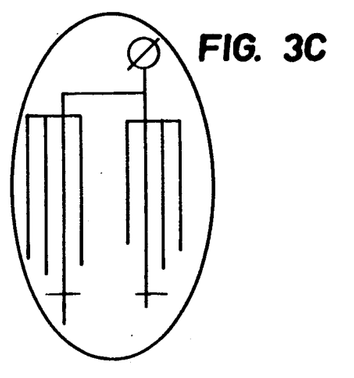
FIG. 3C figuratively illustrates recrystallized rice starch as viewed at the molecular level after tempering.

With joint reference now directed to FIGS. 3A-3C, amylopectin, which makes up the greater portion of native starch in the rice kernel, is depicted symbolically in FIG. 3A. It will be appreciated that the starch structure is not visible to the naked eye as it occurs on the molecular level. While various models have been proposed, the "cluster" model such as that depicted herein is believed most expressive of amylopectin properties. Amylopectin is the branch-form crystal structure of starch which typically appears in raw, unprocessed rice. As water is absorbed into the rice kernel during soaking and steaming, the starch crystal structure breaks down, and the starch gelatinizes, or "melts" together to a nonstructured "gel." Gelatinized starch is depicted symbolically in FIG. 3B. When substantially complete gelatinization occurs such as in the present process, the crystal structure of the starch is fully broken down. Gelatinizing starch in the rice kernel facilitates the inflow of nutrients and vitamins from the outer bran layers into the rice kernel. As the rice endosperm hardens during drying, the vitamins and nutrients are "captured" within the kernel.

During tempering, the rice kernel "cools" slowly so that the gelatinized starch molecules are allowed to reassociate or "retrograde." The starch forms into crystals which have a more angular, rigid crystal structure than the branch-form native amylopectin designated in FIG. 3A. With reference to FIG. 3C, reassociated starch is symbolically depicted as it appears after tempering. The nutrients and vitamins are locked within the kernel. The rigid crystal structure of the reassociated starch makes the rice highly resistant to breakdown and starch leachout during subsequent exposure to water and heat, such as on a steamtable. However, based on our experimentation, if tempering occurs at higher moisture content levels (e.g. prior to pre-drying) reassociation at practical tempering temperatures is substantially inhibited. Benefits of reduced starchiness and stickiness are largely lost if the rice is not pre-dried prior to tempering. Moreover, closely controlling tempering temperatures in relation to moisture content significantly enhances the rate of starch reassociation, as evidenced by a reduction in maximum distilled water uptake (MDWU).

Experimental comparison of rice samples of various processes reveals that the present process renders new and unexpected results not achieved by application of prior art processes. Experimental data illustrated in the graphs of FIGS. 4-6, and in the tables set forth below is explained in detail in the following examples. Generally speaking, the results illustrate that the high-integrity rice product of the present process displays substantial resistance to breakdown during extended periods of steamtable exposure and retains appealing color, texture, flavor, and overall eating quality. The following examples are presented for clarification and are not intended to be construed as limiting.

EXAMPLE I

Laboratory processing of parboiled rice samples revealed that tempering in accordance with our invention between drying stages resulted in improved rice. Specifically, kernel integrity was increased, and the rice was less sticky and starchy than conventionally processed samples. The tested rice retained a pleasing appearance and flavor. Results are listed in Tables I and II hereinafter.

The control samples 1 and 1' were processed by standard methods. Samples 2 and 2' were tempered for four hours at 49-55 degrees Celsius after partial drying to approximately 28% moisture d.s.b. before final drying. Afterward, the samples were lab-milled and subjected to various tests for various quality factors, including MDWU and "cooked" and "steamtable" sensory evaluations for color, texture (stickiness), the presence/absence of free starch, and kernel integrity. An overall average score was then calculated from the panel scores. Such "cooked" evaluations were made immediately after cooking was complete. The "steamtable" evaluations were performed after 90 minutes on a steamtable. Results of these tests are shown in Tables I and II:

TABLE I

COOKED QUALITY OF PARBOILED RICE
Sensory Panel Scores

| SAMPLE | TEMPERED | MDWU* | Color | Texture | Free Starch | Kernel Integrity | Overall Average |
|---|---|---|---|---|---|---|---|
| 1 | NO | 157 | 7.0 | 6.8 | 6.8 | 7.0 | 6.9 |
| 1' | NO | 144 | 7.5 | 7.0 | 6.8 | 6.8 | 7.0 |
| 2 | YES | 97 | 7.3 | 7.3 | 7.3 | 7.3 | 7.3 |
| 2' | YES | 95 | 7.5 | 7.3 | 7.3 | 7.0 | 7.3 |

*Expressed as final percent moisture, d.s.b.

TABLE II

STEAMTABLE QUALITY OF PARBOILED RICE
Sensory Panel Scores

| SAMPLE | TEMPERED | Color | Texture | Free Starch | Kernel Integrity | Overall Average |
|---|---|---|---|---|---|---|
| 1 | NO | 6.9 | 5.8 | 5.8 | 5.8 | 6.1 |
| 1' | NO | 7.3 | 6.0 | 6.0 | 6.3 | 6.4 |
| 2 | YES | 7.3 | 6.7 | 6.7 | 6.7 | 6.9 |
| 2' | YES | 7.3 | 6.5 | 6.5 | 6.5 | 6.7 |

As indicated, tempering between drying phases in accordance with the present process dramatically reduced MDWU. Importantly, tempering resulted in less free starch with no perceived loss in kernel integrity.

EXAMPLE II

Figure 5:
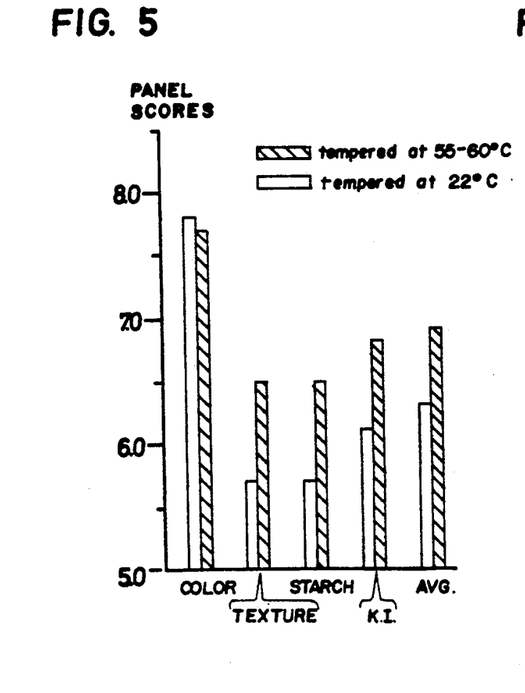
FIG. 5 is a bar graph relating rice tempering temperatures to average panel scores.

With reference to the bar shown in FIG. 5, the importance of tempering temperature in achieving the desired effect is demonstrated. Samples of parboiled rice, after partial pre-drying, were subjected to a four-hour treatment of tempering at either 22 degrees Celsius or 55 degrees Celsius. Samples were then finish-dried to approximately 16 percent moisture, d.s.b. and lab-milled. Cooked samples of each were then held on a steamtable for 90 minutes and evaluated by standard sensory panel procedures. As shown in FIG. 5, rice tempered at 55 degrees Celsius resulted in a far superior product for steamtable use.

EXAMPLE III

Figure 6:
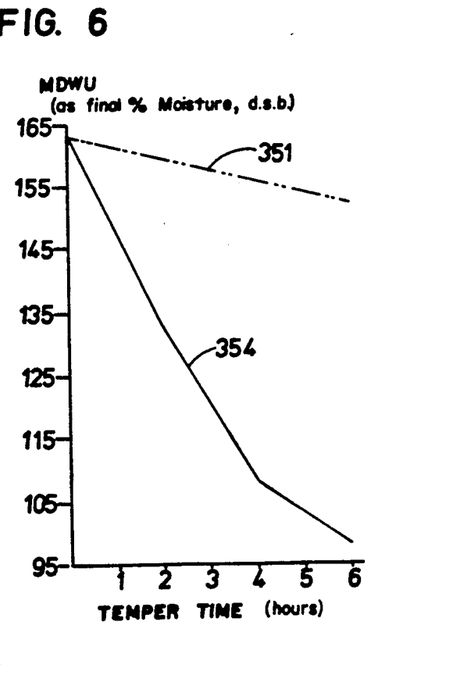
FIG. 6 is a graph relating tempering temperature and time to maximum distilled water uptake (MDWU)
Figure 7:
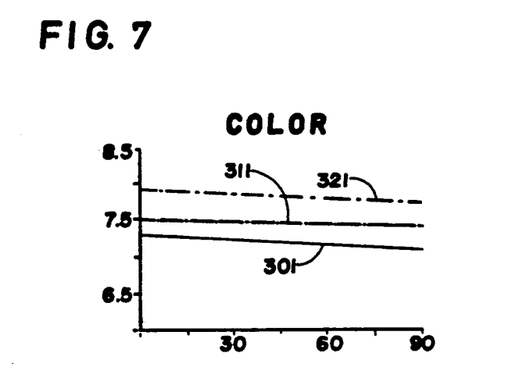
FIGS. 7-11 are graphs relating average panel scores for tested rice to steamtable exposure, respectively plotting factors of color, texture, free starch, kernel integrity, and overall quality.
Figure 8:
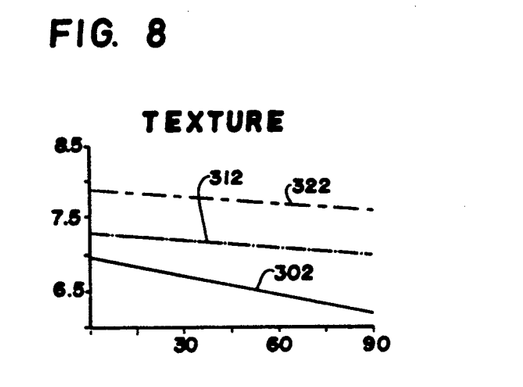
Figure 9:
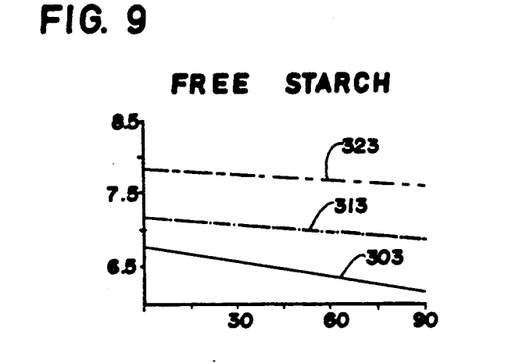
Figure 10:
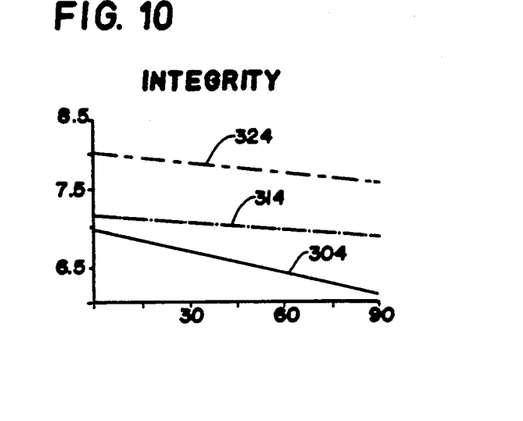
Figure 11:
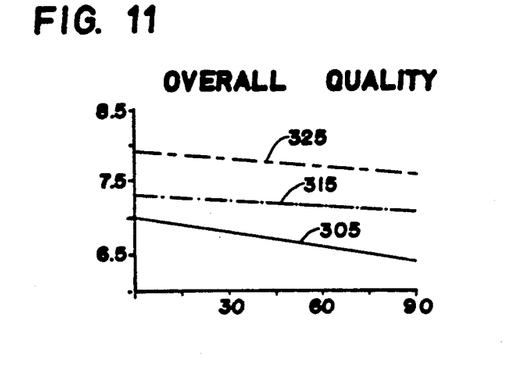

FIG. 6 illustrates the effects of tempering time and tempering temperature upon MDWU at room temperature for milled rice. For this study, samples of parboiled and partially pre-dried rice were tempered for zero, two, four and six hours at either 22 degrees Celsius (trace 351) or 49 degrees Celsius (trace 35) prior to finish-drying. MDWU is generally inversely related to tempering time.

Tempering at 49 degrees Celsius produced a much greater reduction in MDWU for a given tempering time than did tempering at 22 degrees Celsius. It is therefore concluded that MDWU is also inversely related to the degree of starch reassociation in completely gelatinized (85% or more) rice starch. Thus, MDWU may be monitored as a quality control parameter in the production of rice of improved stability by our new process.

EXAMPLE IV

Rice soaked to roughly 43% d.s.b. moisture content was thereafter steamed to substantially completely gelatinize the starch content and to increase the water content to 59 percent d.s.b. Control sample (A) was dried after steaming. Samples B-D, after predrying, were subjected to various tempering times as indicated. The samples were dried and allowed to rest prior to testing for cooking quality. All samples were then subjected to extended steamtable exposure of ninety minutes. Average scores for the sample groups are listed in Table III below.

TABLE III

COOKED AND STEAMTABLE QUALITIES OF PARBOILED RICE

Scores first listed for each sample (A) are initial cooking quality prior to steamtable exposure. The second-listed scores for each sample (A') were achieved after steamtable exposure.

| Sample | Hours Dwell Time | Color | Texture | Free Starch | Integrity | Overall Quality |
|---|---|---|---|---|---|---|
| A  | 0   | 7.3 | 7.0  | 6.8 | 7.0 | 7.0 |
| A' | 0   | 7.1 | 6.2  | 6.2 | 6.1 | 6.4 |
| B  | 4   | 7.5 | 7.3  | 7.2 | 7.2 | 7.3 |
| B' | 4   | 7.4 | 7.0  | 6.9 | 6.9 | 7.1 |
| C  | 6   | 7.9 | 7.9  | 7.8 | 8.0 | 7.9 |
| C' | 6   | 7.7 | 7.6  | 7.6 | 7.6 | 7.6 |
| D  | 6.5 | 7.9 | 8.0  | 8.0 | 8.0 | 8.0 |
| D' | 6.5 | 7.6 | 7.6  | 7.6 | 7.6 | 7.6 |

A comparison of scores of the untempered control samples (A, A') with those of the tempered samples reveals that prolonged periods of tempering substantially improved color, texture, and kernel integrity. The cooked free starch levels are also notably improved in the tempered rice. Even after prolonged steamtable exposure, free starch scores are acceptable. Overall quality of the rice samples improves with prolonged periods of tempering in accordance with the present process.

EXAMPLE V

Figure 4:
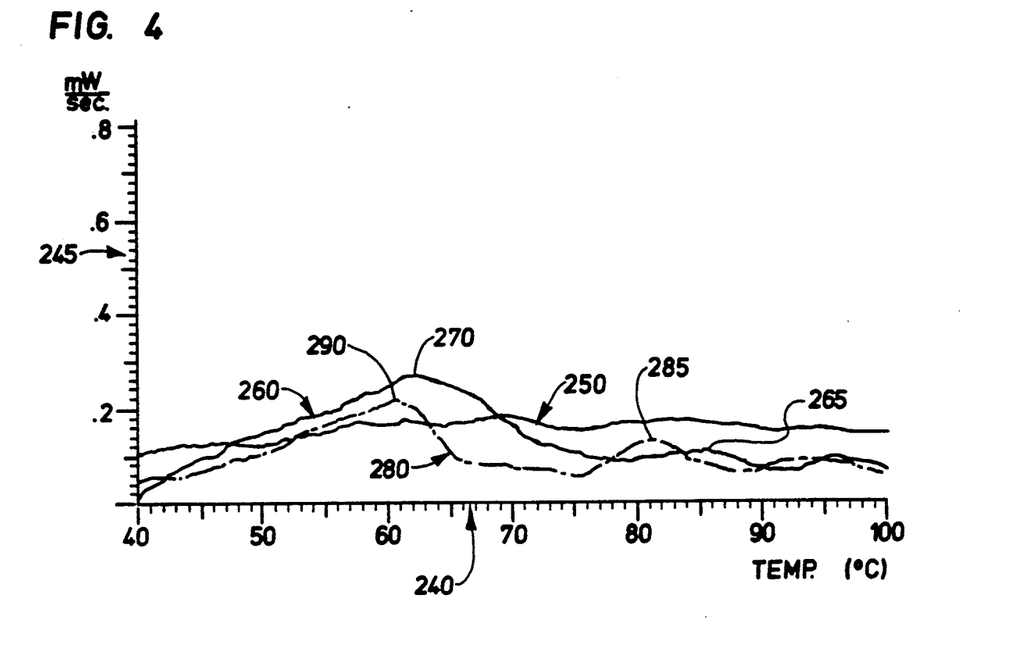
FIG. 4 is a graph depicting comparative DSC scans of various rice samples, illustrating crystallization and gelatinization peaks characteristic of our new rice product.

Reference is now directed to FIG. 4, which depicts the results of DSC scans of samples of rice of various processes. The graphical traces reveal the degree of starch gelatinization and starch reassociation in the particular samples. The degree of gelatinization may be determined by the presence or absence of an endothermic peak observed in the temperature range of 75 to 85 degrees Celsius.

Raw, ungelatinized starch, for example, exhibits a major peak, while fully gelatinized starch produces virtually no peak in this temperature range. Peak size is inversely proportional to the degree of gelatinization. Starch reassociation produces an endothermic peak in the DSC in the temperature range of 55-65 degrees Celsius. Peak size is directly proportional to the extent of starch reassociation.

In the DSC, a rice sample of roughly 4 grams is exposed to temperatures ranging from 40.0 to 100.0 degrees Celsius at a rate of 10.0 degrees Celsius per minute. The heat flow into the rice sample is measured in terms of milliwatts per second. Temperature is plotted along the X-axis 240 in degrees Celsius. Heat flow in MW/SEC is plotted along the Y-axis 245 of FIG. 4.

A sample of rice processed by conventional parboiling methods without tempering is indicated by the solid line designated by the reference numeral 250. The graph of 250 is practically linear, with a minor peak visible at roughly 82 degrees Celsius and roughly 0.2 MW/SEC. The absence of other peaks also indicates that practically no starch reassociation has occurred in this sample.

A sample of rice processed in accordance with the present invention is indicated by trace 260. That sample was tempered for 6.5 hours. Graph 260 reveals two notable peaks. The gelatinization peak 265 occurs at roughly 86 degrees Celsius and 0.15 MW/SEC. This indicates a gelatinization of roughly 94 percent, and gelatinization is thus substantially complete in this sample. A more prominent peak 270 is reported at approximately 63 degrees Celsius and roughly 0.275 MW/SEC. Based on experimentation, peak 270 reveals substantial starch reassociation in the sample. Such a crystallization peak is not demonstrated in the conventionally parboiled rice sample of line 250.

A third sample of rice processed in accordance with the present invention, and indicated by trace 280, was tempered for four hours. The gelatinization peak 285 occurs at roughly 82 degrees Celsius and 0.160 MW/SEC. Thus substantially complete gelatinization is also indicated in this sample. Importantly, the reduced tempering period resulted in substantially decreased starch reassociation. The starch reassociation peak 290 is notably smaller than that of the longer-tempered sample 260, occurring at roughly 62 degrees and 0.195 MW/SEC.

These graphs demonstrate, in accordance with the data illustrated in Tables II and III above, that prolonged tempering at low moisture content favors substantial starch reassociation. As indicated, such starch reassociation enables the rice product to withstand extended steamtable exposure without breakdown or deterioration of kernel integrity, color, texture, or flavor.

Thus, the present process yields a highly resistant rice which is ideally adapted for extended periods of steam table storage.

EXAMPLE VI

In FIGS. 7-11 the duration of steamtable exposure is plotted on the X-axis from 0 to 90 minutes. The average overall quality scores achieved are plotted on the Y-axis, and range between 6.0 and 8.5. In FIGS. 7-11 untempered, parboiled rice has been indicated by the traces 301-305 respectively. Rice samples tempered four hours are represented by traces 311-315; traces 321-325 represent rice tempered six hours. Traces 301-305 show significant steamtable degradation.

From these graphs one can see that in the quality factors of concern, especially texture, free starch and kernel integrity, the rates of quality decline were greatly reduced in the tempered samples produced by our new process. This is evidenced by the reduction in slope in these curves.

EXAMPLE VII

Figure 12:
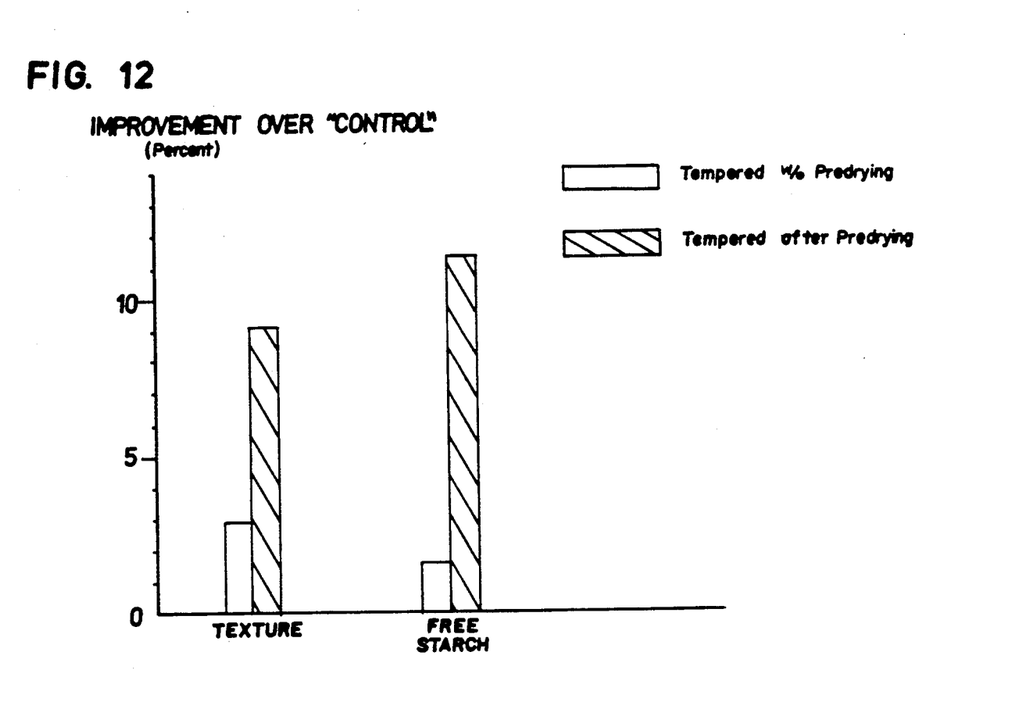
FIG. 12 is a bar graph illustrating relative improvements in sensory panel scores for texture and free starch of parboiled rice tempered with and without pre-drying; and, FIG. 13 graphically illustrates the relation between MDWU (as final percent moisture, d.s.b.) to certain rice qualities.

The effects of tempering after partial pre-drying to approximately 25-35% moisture d.s.b. versus tempering immediately following steaming and without pre-drying (at approximately 49-54% moisture d.s.b) are compared in FIG. 12. Parboiled rice samples were collected either immediately following steaming or after partial drying and tempered on a laboratory scale basis. Samples were subsequently finish-dried, milled, cooked, and tested for sensory quality after 90 minutes on a steamtable. As graphically illustrated, tempering after pre-drying resulted in vastly improved free starch and texture (stickiness) scores. In contrast, only very minor improvement in these parameters was observed in the sample tempered without pre-drying.

EXAMPLE VIII

Figure 13:
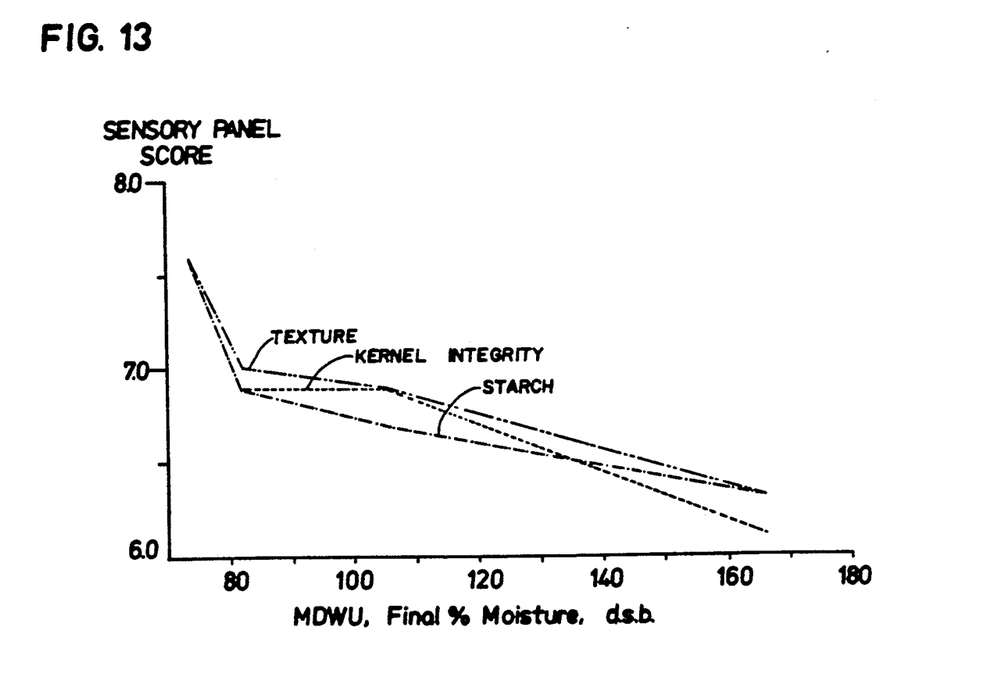

A rice sample was soaked, steamed to essentially complete gelatinization (i.e. approximately 85% gelatinization), pre-dried to approximately 25-33% moisture d.s.b., and then tempered for zero, two, four or six hours. Afterwards it was finish dried to approximately 16% moisture d.s.b., and then milled and tested for MDWU and sensory quality after 90 minutes on a steamtable. Sensory scores for texture, free starch, and kernel integrity were then plotted against MDWU as shown in FIG. 13. The data clearly demonstrates that as MDWU is reduced, higher sensory scores result. We believe this data further substantiates the negative correlation between MDWU and extent of starch reassociation.

Thus, the present process is demonstrated capable of producing a unique rice product which is well suited for use in the modern food service setting. While the rice product requires longer cooking times for rehydration, it is nonetheless highly resistant to breakdown and starch leachout in response to exposure to steamtables.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A process for immunizing parboiled rice from steam table degradation by making it highly resistant to breakdown and stickiness over extended periods of exposure to water and heat in a steam table, said process comprising the steps of:
   (a) providing a source of raw, precleaned rice;
   (b) soaking said precleaned rice to provide a uniformly distributed grain moisture content of approximately 43-49% d.s.b.;
   (c) steaming the soaked rice outputted from step at between 10-20 p.s.i.g. for one to ten minutes to effectuate substantially complete and uniform gelatinization of the rice starch;
   (d) predrying the rice from step (c) to quickly reduce the moisture content thereof to an overall moisture content of approximately 25-33% d.s.b.;
   (e) tempering the rice of step (d) for at least two hours between 38 and 66 degrees Celsius so as to accelerate bonding between the starch molecules to encourage substantial starch reassociation and crystallization for increasing the resistance of the rice to breakdown, starch leachout, and stickiness to particularly adapt said rice for steam table use;
   (f) drying the tempered rice of step (e); and,
   (g) milling the dried rice of step (f) to provide said high integrity rice.

2. The parboiling process as defined in claim 1 wherein rice is transferred through said tempering step 1 (e) in small batches on a first in, first out basis.

3. A process for producing a high integrity, slow cooking rice product for steam tables, said process comprising the steps of:
   (a) providing a source of raw, precleaned rice;
   (b) soaking said precleaned rice to provide a uniformly distributed grain moisture content of approximately 43-49% d.s.b.;
   (c) steaming the soaked rice outputted from step (b) at between 10-20 p.s.i.g. for one to ten minutes to effectuate substantially complete and uniform gelatinization of the race starch;
   (d) predrying the rice from step (c) to quickly reduce the moisture content thereof to an overall moisture content of approximately 25-33% d.s.b.;
   (e) tempering the rice of step (d) for at least two hours at temperatures below the cooking or gelatinization point of rice starch so as to accelerate bonding between the starch molecules to encourage substantial starch reassociation and crystallization and to particularly adapt said rice for steam table use by making it resistant to steam table degradation;
   (f) drying the tempered rice of step (e); and,
   (g) milling the dried rice of step (f)) to provide said high integrity rice.

4. The parboiling process as defined in claim 3 wherein rice is transferred through said tempering step 3 (e) in small batches on a first in, first out basis.

* * * * *